(12) United States Patent
Watari et al.

(10) Patent No.: US 12,479,503 B2
(45) Date of Patent: Nov. 25, 2025

(54) VEHICLE AND VEHICLE CONTROL METHOD

(71) Applicant: TOYOTA JIDOSHA KABUSHIKI KAISHA, Toyota (JP)

(72) Inventors: Yuji Watari, Toyota (JP); Ryo Matsumoto, Toyota (JP); Ryo Irie, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 474 days.

(21) Appl. No.: 18/091,685

(22) Filed: Dec. 30, 2022

(65) Prior Publication Data
US 2023/0286578 A1    Sep. 14, 2023

(30) Foreign Application Priority Data
Mar. 10, 2022  (JP) ................. 2022-037201

(51) Int. Cl.
| | | |
|---|---|---|
| *B62D 6/10* | (2006.01) | |
| *B62D 1/28* | (2006.01) | |
| *B62D 5/04* | (2006.01) | |
| *B62D 6/00* | (2006.01) | |
| *B62D 15/02* | (2006.01) | |

(52) U.S. Cl.
CPC ............... *B62D 6/10* (2013.01); *B62D 1/286* (2013.01); *B62D 5/0424* (2013.01); *B62D 15/025* (2013.01); *B62D 5/0463* (2013.01); *B62D 5/0496* (2013.01); *B62D 6/007* (2013.01)

(58) Field of Classification Search
CPC ........ B62D 6/10; B62D 5/0424; B62D 1/286; B62D 15/025; B62D 5/0463; B62D 5/0496; B62D 6/007
See application file for complete search history.

(56) References Cited

U.S. PATENT DOCUMENTS 7,510,038 B2 * 3/2009 Kaufmann ........... B62D 15/029
                                                382/104
7,642,738 B2 * 1/2010 Hamada ................. B62D 5/065
                                                318/434

(Continued)

FOREIGN PATENT DOCUMENTS

DE    102017215842 A1    3/2019
JP    2010-188854 A      9/2010

(Continued)

*Primary Examiner* — Timothy Wilhelm
(74) *Attorney, Agent, or Firm* — Dinsmore & Shohl LLP (57) ABSTRACT

A vehicle includes a steering device, a torque sensor, and an electronic control unit. The steering device includes a rack shaft, a steering shaft, and a turning actuator including an electric motor connected to the rack shaft or the steering shaft via a motion conversion mechanism. The torque sensor is configured to detect a steering torque by a driver, the torque sensor being attached to the steering shaft. The electronic control unit is configured to switch from turning of the wheels by an automatic steering control to turning of the wheels based on at least a steering operation by the driver in a case where a torque detected by the torque sensor exceeds a torque threshold value during execution of the automatic steering control of the wheels. The torque threshold value is changed in accordance with a temperature of the motion conversion mechanism.

3 Claims, 5 Drawing Sheets

(56) References Cited

U.S. PATENT DOCUMENTS

| | | | | |
|---|---|---|---|---|
| 8,560,178 | B2* | 10/2013 | Derry | B62D 5/0463 |
| | | | | 701/41 |
| 8,892,308 | B2* | 11/2014 | Davis | B62D 1/286 |
| | | | | 701/41 |
| 8,948,973 | B2* | 2/2015 | Heitzer | B62D 5/0463 |
| | | | | 180/443 |
| 9,637,107 | B2* | 5/2017 | Matsuno | B62D 15/025 |
| 11,066,096 | B2* | 7/2021 | Kamemura | B62D 5/006 |
| 11,273,863 | B2* | 3/2022 | Wesenberg | B62D 5/0484 |
| 11,427,247 | B2* | 8/2022 | Kuwabara | G05D 1/021 |
| 11,498,590 | B2* | 11/2022 | Lee | B60W 60/0059 |
| 11,560,171 | B2* | 1/2023 | Friedel | B62D 5/0496 |
| 11,584,386 | B2* | 2/2023 | Chiba | B60W 50/12 |
| 2004/0189239 | A1* | 9/2004 | Islam | H02P 21/16 |
| | | | | 318/701 |
| 2018/0093701 | A1* | 4/2018 | Kodera | B62D 5/0478 |
| 2020/0255054 | A1 | 8/2020 | Friedel et al. | |
| 2021/0339773 | A1 | 11/2021 | Lee et al. | |

FOREIGN PATENT DOCUMENTS

| | | |
|---|---|---|
| JP | 2015-013498 A | 1/2015 |
| JP | 2018-165156 A | 10/2018 |

\* cited by examiner

VEHICLE AND VEHICLE CONTROL METHOD

CROSS-REFERENCE TO RELATED APPLICATION

This application claims priority to Japanese Patent Application No. 2022-037201 filed on Mar. 10, 2022, incorporated herein by reference in its entirety.

BACKGROUND

1. Technical Field

The present disclosure relates to a vehicle and a vehicle control method.

2. Description of Related Art

Japanese Unexamined Patent Application Publication No. 2010-188854 (JP 2010-188854 A) discloses a lane keeping assist device. The lane keeping assist device executes a first steering angle control in which emphasis is put on lane followability in a case where steering intention of a driver is not detected, and executes a second steering angle control in which a steering operation of the driver tends to be reflected in a case where the steering intention of the driver is detected. The presence or absence of the steering intention is determined based on a steering torque and a steering angle deviation.

SUMMARY

Switching from turning of wheels by an "automatic steering control" that does not need a steering operation by a driver to turning of wheels based on at least the steering operation by the driver is executed in a case where a determination is made that a steering intervention by the driver is executed.

In the automatic steering control described above, a torque sensor used to determine the presence or absence of the steering intervention (steering intention) based on a steering torque by the driver may output a torque value, for example, due to a disturbance from a road surface even in a case where the driver does not put his/her hands on a steering wheel. In addition, the torque value output due to such a factor is changed due to temperature characteristics of a friction component and a viscosity component of a steering device. In a case where a torque threshold value is uniformly set regardless of a temperature without focusing on the output torque value, the following problems occur. That is, in a case where the uniform torque threshold value is low, an erroneous determination of the steering intervention occurs. On the other hand, in a case where the uniform torque threshold value is high, a transition to a control state in which the steering operation by the driver is reflected in the turning of the wheels is difficult.

The present disclosure is to enable achievement of both difficulty of the erroneous determination of the steering intervention by the driver and ease of the control state transition in a vehicle in which the automatic steering control is executed.

The present disclosure relates to a vehicle including a steering device, a torque sensor, and an electronic control unit. The steering device includes a rack shaft connected to wheels, a steering shaft connecting a steering wheel and the rack shaft, and a turning actuator including an electric motor connected to the rack shaft or the steering shaft via a motion conversion mechanism. The torque sensor is configured to detect a steering torque by a driver, the torque sensor being attached to the steering shaft. The electronic control unit is configured to switch from turning of the wheels by an automatic steering control to turning of the wheels based on at least a steering operation by the driver in a case where a torque detected by the torque sensor exceeds a torque threshold value during execution of the automatic steering control of the wheels. The torque threshold value is changed in accordance with a temperature of the motion conversion mechanism.

The present disclosure relates to a vehicle control method of controlling a vehicle including a steering device and a torque sensor. The steering device includes a rack shaft connected to wheels, a steering shaft connecting a steering wheel and the rack shaft, and a turning actuator including an electric motor connected to the rack shaft or the steering shaft via a motion conversion mechanism. The torque sensor is configured to detect a steering torque by a driver, the torque sensor being attached to the steering shaft. The vehicle control method includes switching from turning of the wheels by an automatic steering control to turning of the wheels based on at least a steering operation by the driver in a case where a torque detected by the torque sensor exceeds a torque threshold value during execution of the automatic steering control of the wheels, and changing the torque threshold value in accordance with a temperature of the motion conversion mechanism.

According to the present disclosure, the torque threshold value can be appropriately set in consideration that each of the friction component and the viscosity component of the motion conversion mechanism provided in the turning actuator of the steering device has the temperature characteristic. As a result, as compared with an example in which the torque threshold value is uniformly set regardless of the temperature, both the difficulty of the erroneous determination of the steering intervention and the ease of the control state transition to a non-automatic control state (state in which the turning of the wheels based on at least the steering operation by the driver is executed) accompanying actual application of the steering torque to the steering shaft by the driver can be achieved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In the following, an embodiment of the present disclosure will be described with reference to the accompanying drawings. Note that in a case where the number, a quantity, an amount, a range, and the like of each element are described in the following embodiment, the technical idea according to the present disclosure is not limited to the described numerical values except for a case of being particularly specified or a case of being clearly specified in principle by the described numerical values.

1. Configuration Example of Vehicle

Figure 1:
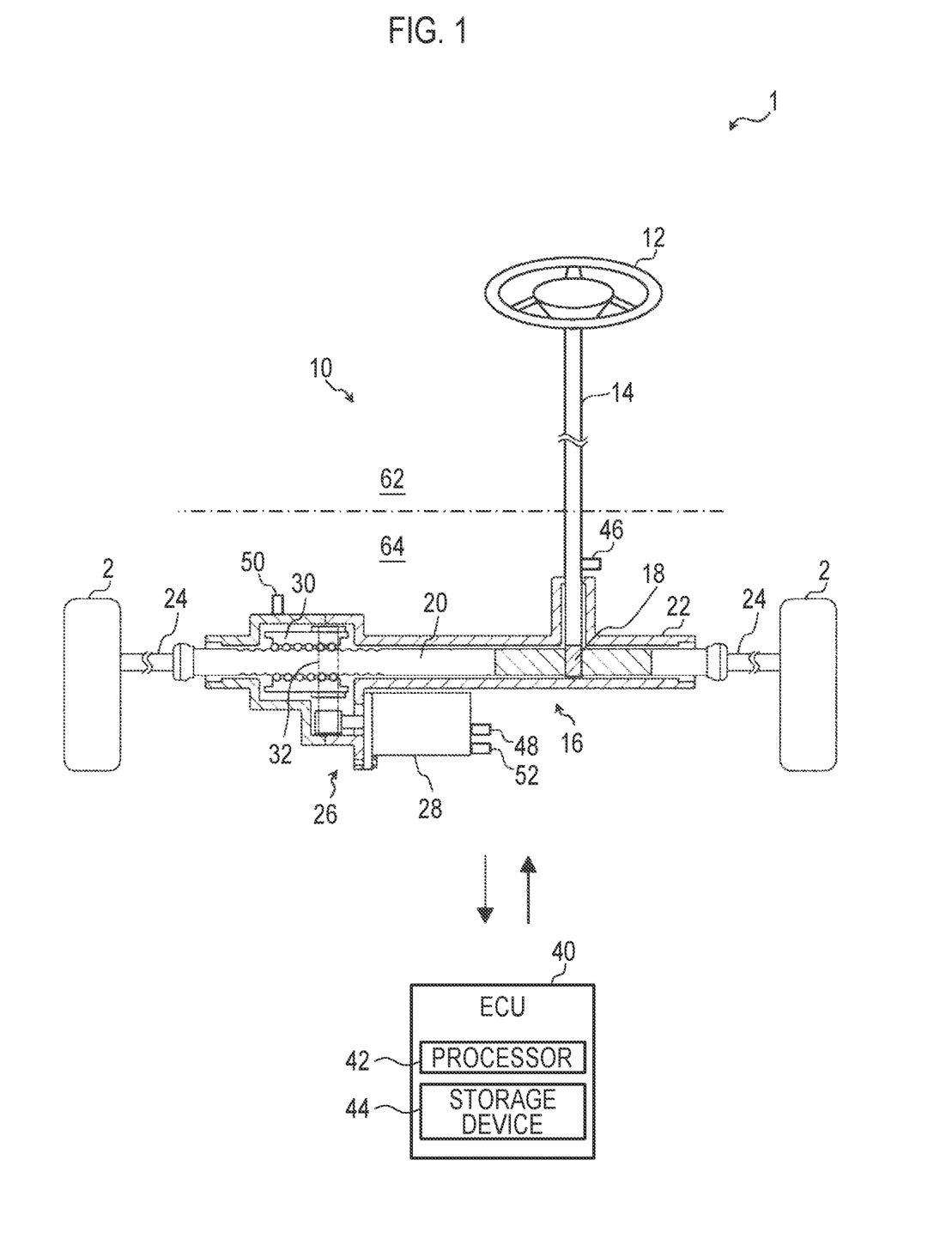
FIG. 1 is a diagram showing an example of a configuration of a vehicle according to an embodiment.

FIG. 1 is a diagram showing an example of a configuration of a vehicle 1 according to the embodiment. As shown in FIG. 1, the vehicle 1 includes a steering device 10. The steering device 10 is a device that turns wheels 2. The steering device 10 includes a steering wheel 12, a steering shaft 14, and a turning unit 16.

The steering wheel 12 is used for a steering operation by a driver. A first end of the steering shaft 14 is connected to the steering wheel 12. A second end of the steering shaft 14 is connected via a pinion gear 18 to a rack shaft (turning shaft) 20 provided in the turning unit 16.

The turning unit 16 includes the pinion gear 18 and the rack shaft 20 as well as a rack housing 22, a pair of tie rods 24, and a turning actuator 26.

The pinion gear 18 and rack shaft 20 are disposed inside the rack housing 22. The rack shaft 20 meshes with the pinion gear 18. Both ends of the rack shaft 20 are connected to the wheels 2, respectively, via the tie rods 24 and knuckles (not shown). The rotation of the steering wheel 12 is transmitted to the pinion gear 18 via the steering shaft 14. The rotational motion of the pinion gear 18 is converted into the linear motion of the rack shaft 20. As a result, a turning angle of the wheels 2 is changed.

The turning actuator 26 generates a force for turning the wheels 2. The turning actuator 26 includes an electric motor 28 and a motion conversion mechanism 30, and includes a belt mechanism 32 as an example. The electric motor 28 is connected to the rack shaft 20 via the belt mechanism 32 and the motion conversion mechanism 30. The motion conversion mechanism 30 is, for example, a ball screw mechanism and is housed inside the rack housing 22. A torque of the electric motor 28 is transmitted to the motion conversion mechanism 30 via the belt mechanism 32. The motion conversion mechanism converts the rotational motion of a rotor of the electric motor 28 into the linear motion of the rack shaft 20. As a result, the turning angle of the wheels 2 is changed.

The turning actuator 26 is used as an electric power steering (EPS) device that assists steering by the driver. Moreover, the turning actuator 26 is used as an actuator that controls the turning angle of the wheels 2 during execution of an "automatic steering control" described below that does not need the steering operation by the driver.

Moreover, the vehicle 1 also includes an electronic control unit (ECU) 40. The ECU 40 controls the turning actuator 26. Specifically, the ECU 40 includes a processor 42, a storage device 44, and an input/output interface. The input/output interface receives sensor signals from sensors attached to the vehicle 1 and outputs operation signals to the turning actuator 26. The processor 42 executes various pieces of processing relating to the control of the turning actuator 26. The storage device 44 stores various programs and various data (including maps) used for the processing by the processor 42. The processing by the ECU 40 is realized by the processor 42 reading out the program from the storage device 44 and executing the read out program. Note that a plurality of ECUs 40 may be provided.

The sensors described above include, for example, various sensors (for example, a sensor that recognizes the surroundings of the vehicle 1, such as a camera) needed for executing the automatic steering control as well as a torque sensor 46, a rotation angle sensor 48, a temperature sensor 50, and a current sensor 52. Specifically, the torque sensor 46 is attached to the steering shaft 14 to detect (estimate) the steering torque that is a torque acting on the steering shaft 14 in a case where the driver rotates the steering wheel 12. The torque sensor 46 detects a torque TR acting on a torsion bar that is a part of the steering shaft 14 based on a torsion angle of the torsion bar. The rotation angle sensor 48 detects a rotation angle of the electric motor 28. The temperature sensor 50 is attached to the rack housing 22 as an example to detect (estimate) a temperature T of the motion conversion mechanism 30. The current sensor 52 detects an output current (driving current) of the turning actuator 26.

Another Disposition Example of Turning Actuator

Note that in the example shown in FIG. 1, in a power transmission path between the steering wheel 12 and the wheels 2, the turning actuator 26 is disposed on the rack shaft 20 that executes the linear motion. However, a "turning actuator" according to the present disclosure may be disposed on the steering shaft 14 that executes the rotational motion (another configuration example A). In the other configuration example A, the motion conversion mechanism interposed between the electric motor provided in the turning actuator and the steering shaft 14 converts the rotational motion of the rotor of the electric motor into the rotational motion of the steering shaft 14, and is, for example, a gear mechanism, such as a worm mechanism. Moreover, in the other configuration example A, the torque sensor for detecting the steering torque by the driver is disposed on a portion (for example, a torsion bar) of the steering shaft 14 between the steering wheel 12 and the electric motor described above.

2. Steering Control

A steering control using the turning actuator 26 by the ECU 40 includes the "automatic steering control" as well as a torque assist control for assisting the steering by the driver.

The automatic steering control is to automatically execute the steering of the vehicle 1 that does not need the steering operation by the driver. For example, in a case where an execution request for the automatic steering control is received from the driver who operates a human machine interface (HMI) device, such as a button, the ECU 40 executes the automatic steering control on the condition that a predetermined execution condition is satisfied. The automatic steering control is executed in a state in which the driver takes his/her hands off the steering wheel 12 or puts his/her hands on the steering wheel 12.

Specifically, the automatic steering control is included in, for example, an autonomous driving control that automatically executes each driving operation of acceleration, deceleration, and steering of the vehicle. In the automatic steering control, the ECU 40 controls the turning actuator 26 (electric motor 28) to generate a turning torque for bringing the turning angle of the wheels (turned wheels) 2 closer to a target turning angle. Note that the automatic steering control may be executed without the automatic control of the driving operation of at least one of the acceleration and the deceleration.

In the following, a steering state in which the automatic steering control is executed is referred to as an "automatic control state", and a steering state that is not a state in which solely the automatic steering control is executed is referred to as a "non-automatic control state". In the non-automatic control state, basically, the turning of the wheels 2 is executed based on the steering operation by the driver with the assistance of the torque assist control. Note that the non-automatic control state is a state in which the turning of the wheels 2 is executed based on at least the steering operation by the driver. Therefore, in the non-automatic control state, instead of the example in which the turning is based solely on the steering operation by the driver, the turning of the wheels 2 may be executed by cooperation between the steering operation by the driver and an automatic steering operation using the turning actuator 26.

A transition from the automatic control state to the non-automatic control state is executed in a case where a determination is made that the steering intervention by the driver is executed during the execution of the automatic steering control. This steering intervention determination is made by using the torque sensor 46. Specifically, in a case where the steering torque by the driver exceeds a predetermined torque threshold value X, a determination is made that the steering intervention is executed.

The torque sensor 46 is used to acquire the steering torque used in the steering intervention determination. That is, the torque sensor 46 is provided to acquire the steering torque by the driver. In a case where the steering operation is being executed by the driver, the torque TR detected by the torque sensor 46 basically corresponds to the steering torque by the driver.

Here, the torque sensor 46 may output a torque value due to a disturbance from a road surface, for example, even in a case where the driver does not put his/her hands on the steering wheel 12. More specifically, the input from the road surface due to the disturbance (for example, unevenness of the road surface) acts on the rack shaft 20 via the wheels 2 and the tie rods 24. In a case where the rack shaft 20 moves due to the input, the torque that twists the steering shaft 14 is input from the rack shaft 20 to the steering shaft 14 via the pinion gear 18. As a result, the torque sensor 46 can output the torque value even in a hands-free state.

In addition, the torque value output due to the factor described above is changed due to temperature characteristics of a friction component and a viscosity component of the steering device 10. More specifically, the torque value is changed due to the temperature characteristics of the friction component and the viscosity component (viscosity component of lubricating oil) of the motion conversion mechanism (for example, the ball screw mechanism) 30 that is interposed between the electric motor 28 and the rack shaft 20 and moves. In a case where the torque threshold value X is uniformly set regardless of the temperature T of the motion conversion mechanism 30 without focusing on the output torque value, the following problems occur. That is, in a case where the uniform torque threshold value X is low, the erroneous determination of the steering intervention occurs. On the other hand, in a case where the uniform torque threshold value X is high, it is difficult to transition to the control state in which the steering operation by the driver is reflected in the turning of the wheels.

In addition, such problems occur in the same manner even in a configuration in which the motion conversion mechanism (for example, the gear mechanism) is disposed between the electric motor provided in the turning actuator and the steering shaft 14, as in the configuration example A.

Figure 2:
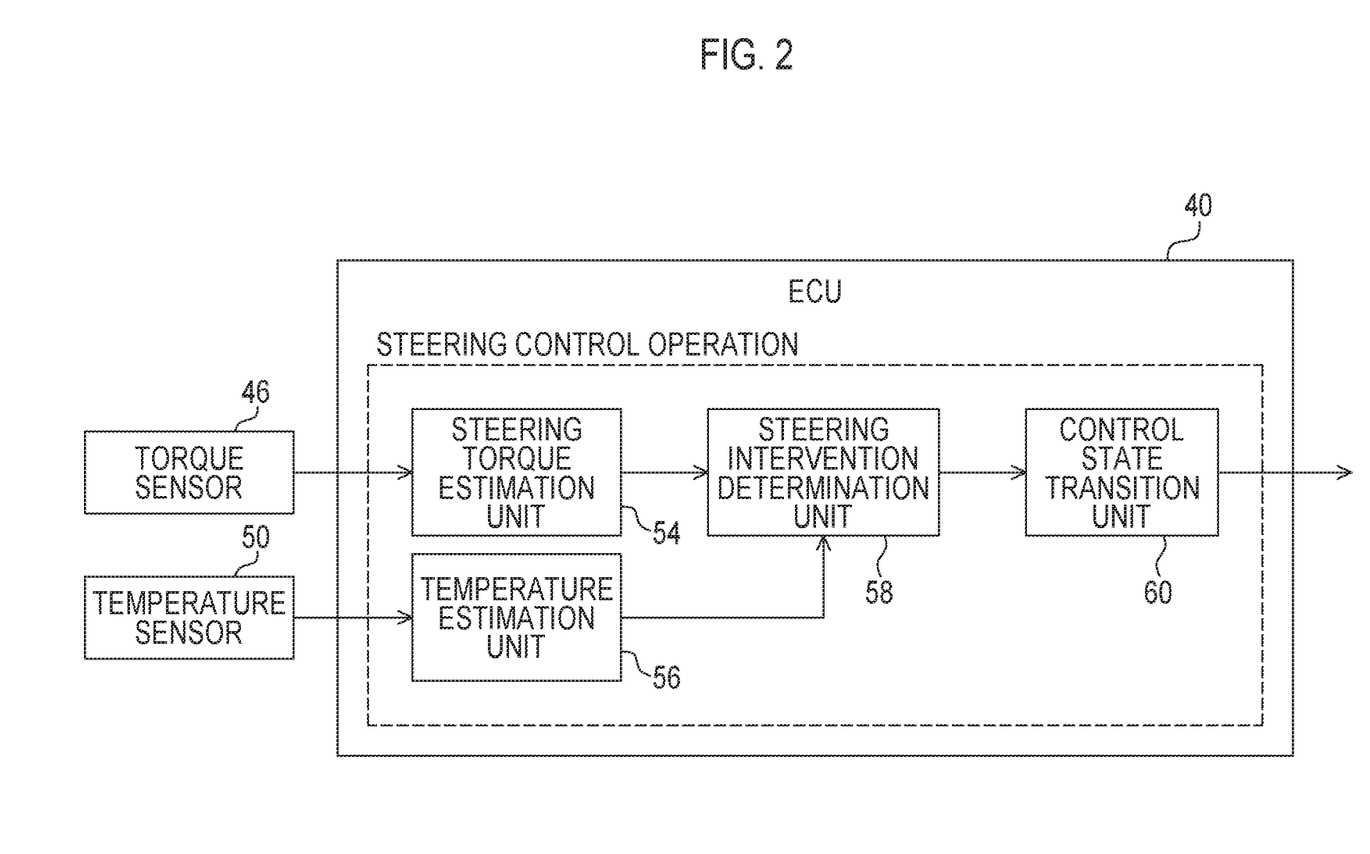
FIG. 2 is a block diagram showing a functional configuration of an ECU relating to a steering control operation according to the embodiment.

In view of the problems described above, the steering intervention determination and the transition of the steering state based on the steering intervention determination in the present embodiment are executed as follows. FIG. 2 is a block diagram showing a functional configuration of the ECU 40 relating to a steering control operation according to the embodiment. The ECU 40 includes a steering torque estimation unit 54, a temperature estimation unit 56, a steering intervention determination unit 58, and a control state transition unit 60. Note that in the example shown in FIG. 2, the steering torque estimation unit 54, the temperature estimation unit 56, the steering intervention determination unit 58, and the control state transition unit 60 are provided by one ECU 40, but may be separately provided by a plurality of ECUs.

The steering torque estimation unit 54 detects the torque TR by using the torque sensor 46 and estimates the detected torque TR as the steering torque.

The temperature estimation unit 56 detects the temperature by using the temperature sensor 50 and estimates the detected temperature as the temperature T of the motion conversion mechanism 30. As described above, the temperature sensor 50 is attached to the rack housing 22. However, an installation location of the temperature sensor 50 used to estimate the temperature T is not limited to the rack housing 22.

That is, the temperature sensor 50 need only be installed at any location in which the temperature T can be estimated, such as a location in which a temperature correlated with the temperature T can be acquired. Therefore, the temperature sensor 50 may be attached to the electric motor 28 positioned around the motion conversion mechanism 30, for example.

Moreover, the turning unit 16 including the turning actuator 26 is disposed in a space (more specifically, in a compartment in which a powertrain component, such as an internal combustion engine, is disposed) 64 that is positioned outside a vehicle cabin 62 of the vehicle 1 and exposed to the outside air. Therefore, the temperature sensor 50 may be installed to detect the temperature of the space 64 (in other words, an environmental temperature around the motion conversion mechanism 30) as the temperature T. Further, for the estimation of the temperature T, for example, the signal of the current sensor 52 may be used together with the signal of the temperature sensor 50.

In addition, in the other configuration example A, the motion conversion mechanism is disposed inside the vehicle cabin 62. Therefore, the temperature sensor used to estimate the temperature T in the other configuration example A may be installed to detect a temperature inside the vehicle cabin 62 that corresponds to an example of the environmental temperature around the motion conversion mechanism.

The steering intervention determination unit 58 compares the torque TR acquired as the steering torque by the steering torque estimation unit 54 with the torque threshold value X during the execution of the automatic steering control. In addition, in a case where the torque TR (absolute value thereof) exceeds the torque threshold value X, the steering intervention determination unit 58 determines that the steering intervention by the driver is executed.

The torque threshold value X used in the steering intervention determination in the present embodiment is not a uniform value regardless of the temperature T of the motion conversion mechanism 30, and is changed in accordance with the temperature T. Specifically, the torque threshold value X is changed to be higher in a case where the temperature T is low than in a case where the temperature T is high.

Figure 3:
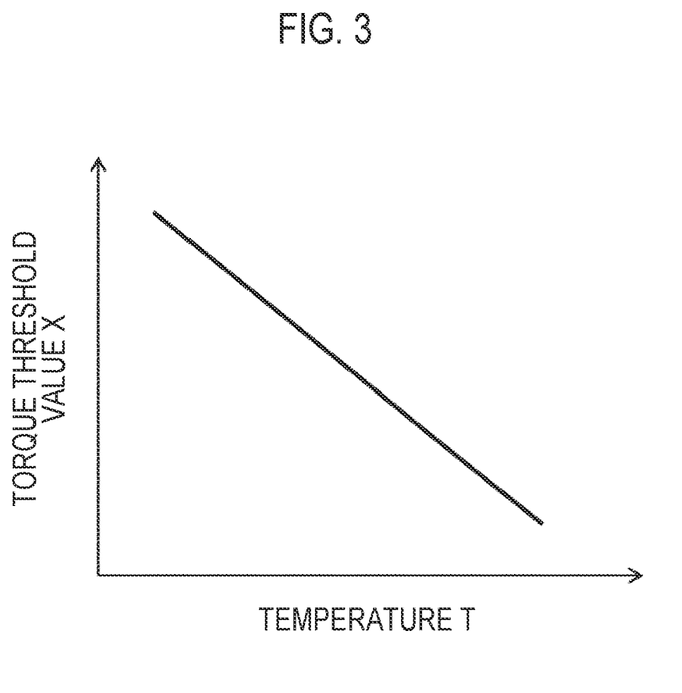
FIG. 3 is a graph showing an example of a relationship between a temperature T and a torque threshold value X.

FIG. 3 is a graph showing an example of a relationship between the temperature T and the torque threshold value X.

In the example shown in FIG. 3, the torque threshold value X is set to be higher as the temperature T is lower, in other words, to be lower as the temperature T is higher. Moreover, in the example shown in FIG. 3, the torque threshold value X is changed linearly with the change in the temperature T, but may be set to be changed in a curvilinear manner.

The control state transition unit 60 transitions the steering state from the automatic control state to the non-automatic control state in a case where the steering intervention determination unit 58 determines that the steering intervention is executed.

Figure 4:
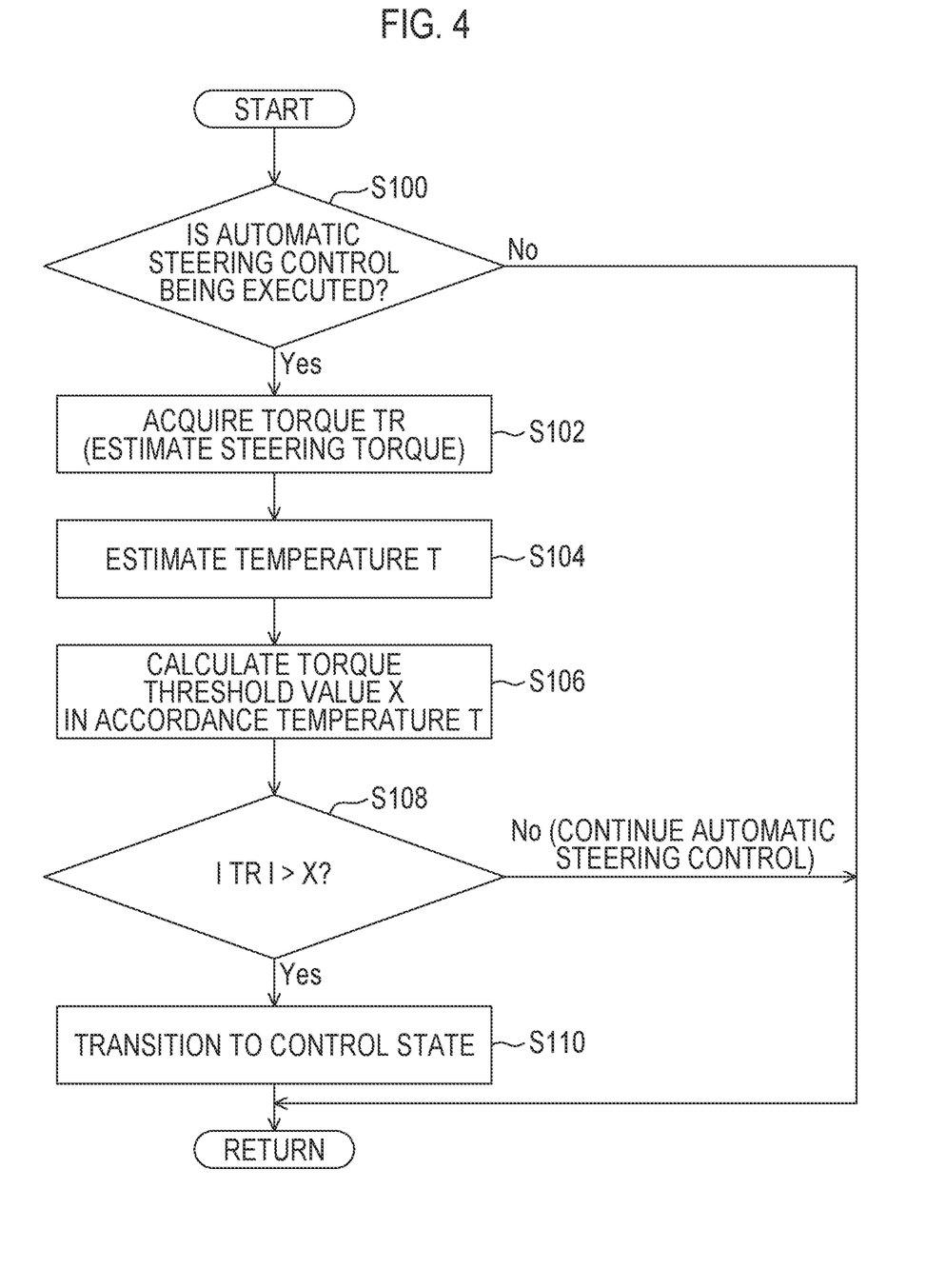
FIG. 4 is a flowchart showing a flow of processing relating to a steering intervention determination and a transition of a steering state based on the steering intervention determination according to the embodiment.

FIG. 4 is a flowchart showing a flow of processing relating to the steering intervention determination and the transition of the steering state based on the steering intervention determination according to the embodiment. The processing of this flowchart is repeatedly executed by the ECU 40 (processor 42) while the vehicle 1 travels.

In FIG. 4, in step S100, the ECU 40 determines whether or not the automatic steering control is being executed. As a result, in a case where a determination result is No, the processing proceeds to RETURN. On the other hand, in a case where the determination result is Yes, the processing proceeds to step S102.

In step S102, the ECU 40 (steering torque estimation unit 54) detects the torque TR by using the torque sensor 46, and estimates the detected torque TR as the steering torque.

Next, in step S104, the ECU 40 (temperature estimation unit 56) detects the temperature by using the temperature sensor 50 as an example, and estimates the detected temperature as the temperature T of the motion conversion mechanism 30.

Next, in step S106, the ECU 40 (steering intervention determination unit 58) calculates the torque threshold value X. The storage device 44 of the ECU 40 stores the relationship between the temperature T and the torque threshold value X (for example, FIG. 3) as a map. The ECU 40 calculates the torque threshold value X in accordance with the temperature T from such a map. Note that the relationship may be stored as a relational expression.

Next, in step S108, the ECU 40 (steering intervention determination unit 58) determines whether or not the absolute value of the torque TR estimated in step S102 exceeds the torque threshold value X calculated in step S106.

In a case where the determination result in step S108 is No (torque |TR|≤torque threshold value X), that is, in a case where a determination is made that the steering intervention by the driver is not executed, the processing proceeds to RETURN. That is, the automatic steering control is continued. On the other hand, in a case where the determination result is Yes (torque |TR|>torque threshold value X), that is, in a case where a determination is made that the steering intervention is executed, the processing proceeds to step S110.

In step S110, the ECU 40 (control state transition unit 60) transitions the steering state from the automatic control state to the non-automatic control state.

3. Effect

As described above, according to the present embodiment, the torque threshold value X for determining whether or not the steering intervention by the driver is changed in accordance with the temperature T of the motion conversion mechanism 30. As a result, it is possible to appropriately set the torque threshold value X in consideration that each of the friction component and the viscosity component of the motion conversion mechanism 30 has the temperature characteristic. As a result, as compared with an example in which the torque threshold value X is uniformly set regardless of the temperature T, it is possible to achieve both the difficulty of the erroneous determination of the steering intervention and the ease of the control state transition to the non-automatic control state accompanying actual application of the steering torque to the steering shaft 14 by the driver.

More specifically, in general, for example, the friction component and the viscosity component of the motion conversion mechanism 30 that is the ball screw mechanism are larger as the temperature T is lower. Therefore, in a case where the input from the road surface acts on the rack shaft 20 as the disturbance, it is difficult for the motion conversion mechanism 30 to move in a case where the temperature T is low. This fact acts to hinder the rack shaft 20 in movement. However, the torque that is input from the rack shaft 20 to the steering shaft 14 in a case where the force acting on the rack shaft 20 from the road surface overcomes a reaction force due to the friction component and the viscosity component of the motion conversion mechanism 30 and the rack shaft 20 starts to move tends to be larger in a case where the temperature T is low than in a case where the temperature T is high. In view of this point, according to the present embodiment, the torque threshold value X is set to be higher in a case where the temperature T is low than in a case where the temperature T is high. As a result, it is possible to appropriately set the torque threshold value X in consideration of the temperature characteristics of the friction component and the viscosity component of the motion conversion mechanism 30.

4. Modification Example Relating to Setting of Torque Threshold Value X

For example, the torque threshold value X that is variable in accordance with the temperature T of the motion conversion mechanism 30 may be set as in the following modification example.

Figure 5:
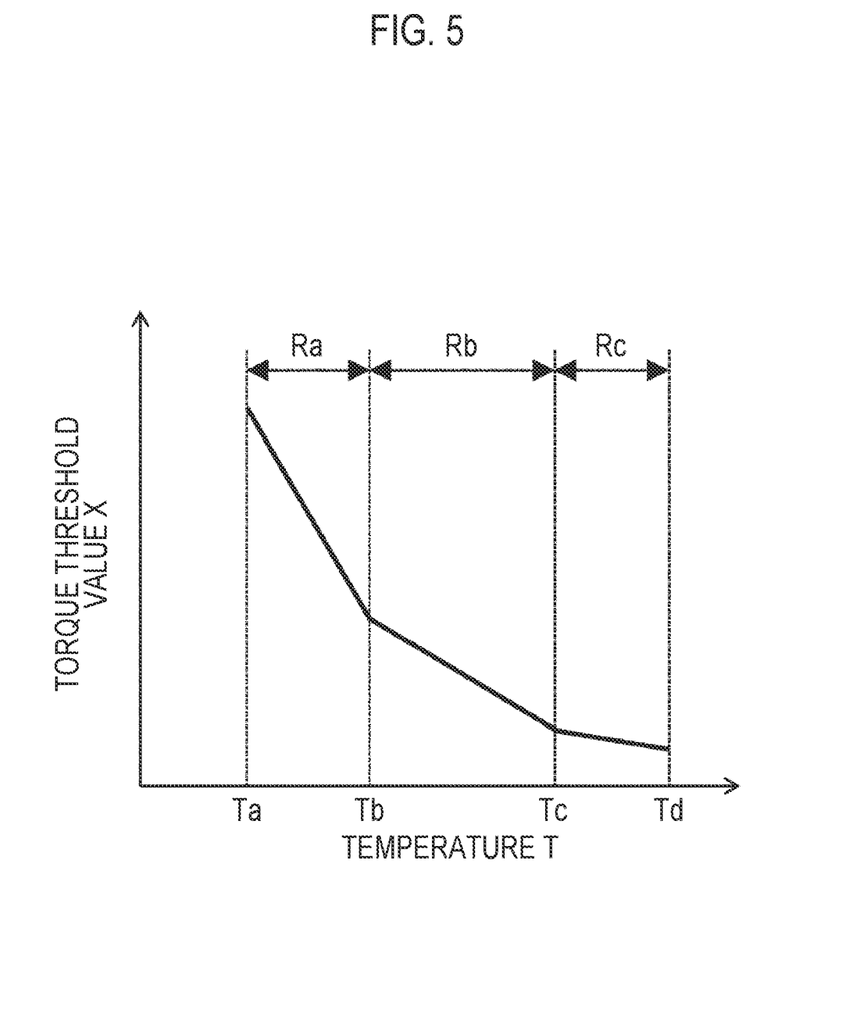
FIG. 5 is a graph for describing a modification example relating to setting of the torque threshold value X according to the present disclosure.

FIG. 5 is a graph for describing a modification example relating to the setting of the torque threshold value X according to the present disclosure. In this modification example, a range of temperature T includes a temperature range Ra, a temperature range Rb, and a temperature range Rc in order from a low-temperature side. The temperature range Ra is a range that is equal to or higher than a temperature value Ta and lower than a temperature value Tb. The temperature range Rb is a range that is equal to or higher than the temperature value Tb and lower than a temperature value Tc. The temperature range Rc is a range that is equal to or higher than the temperature value Tc and lower than a temperature value Td. In addition, the temperature value Ta is a value (for example, −30° C.) indicating an extremely low temperature. The temperature value Tb is a value (for example, 0° C.) indicating a low temperature. The temperature value Tc is a value (for example, 25° C.) indicating a normal temperature. The temperature value Td is a value (for example, 80° C.) indicating a high temperature.

In this modification example, the following can be said in comparison between the temperature range Ra on the low-temperature side and the temperature range Rb on a high-temperature side following the temperature range Ra. That is, as shown in FIG. 5, the torque threshold value X is higher in the temperature range Ra than in the temperature range Rb. In addition, a decrease rate in the torque threshold value X with respect to an increase in the temperature T in the temperature range Ra is larger than a decrease rate in the torque threshold value X with respect to an increase in the temperature T in the temperature range Rb.

Similarly, in this modification example, the following can be said in comparison between the temperature range Rb on the low-temperature side and the temperature range Rc on the high-temperature side following the temperature range Rb. That is, as shown in FIG. 5, the torque threshold value X is higher in the temperature range Rb than in the temperature range Rc. In addition, the decrease rate in the torque threshold value X with respect to the increase in the temperature T in the temperature range Rb is larger than a decrease rate in the torque threshold value X with respect to an increase in the temperature T in the temperature range Rc.

According to this modification example, the torque threshold value X can be set more appropriately in accordance with the temperature T by more appropriately considering the temperature characteristics of the friction component and the viscosity component of the motion conversion mechanism 30.

Note that in the modification example, in the comparison between the temperature range Ra and the temperature range Rb, the temperature range Ra corresponds to an example of a "second temperature range" according to the present disclosure, and the temperature range Rb corresponds to an example of a "first temperature range" according to the present disclosure. Moreover, in the comparison between the temperature range Rb and the temperature range Rc, the temperature range Rb corresponds to another example of the "second temperature range" according to the present disclosure, and the temperature range Rc corresponds to another example of the "first temperature range" according to the present disclosure.

In addition, in FIG. 5 three successive temperature ranges Ra, Rb, Rc are used for the setting of the torque threshold value X that is changed in accordance with temperature T. However, the temperature ranges used for the setting of the torque threshold value X may be two or four or more temperature ranges as long as the relationship between the "first temperature range" and the "second temperature range" described above is satisfied.

What is claimed is:

1. A vehicle comprising:
   a steering device including
      a rack shaft connected to wheels,
      a steering shaft connecting a steering wheel and the rack shaft, and
      a turning actuator including an electric motor connected to the rack shaft or the steering shaft via a motion conversion mechanism;
   a torque sensor configured to detect a steering torque by a driver, the torque sensor being attached to the steering shaft; and
   an electronic control unit configured to switch from turning of the wheels by an automatic steering control to turning of the wheels based on at least a steering operation by the driver in a case where a torque detected by the torque sensor exceeds a torque threshold value during execution of the automatic steering control of the wheels,
   wherein the torque threshold value is changed in accordance with a temperature of the motion conversion mechanism,
   wherein a range of the temperature includes a first temperature range and a second temperature range on a low-temperature side with respect to the first temperature range;
   wherein the torque threshold value is higher in the second temperature range than in the first temperature range; and
   wherein a decrease rate of the torque threshold value with respect to an increase in the temperature in the second temperature range is larger than a decrease rate of the torque threshold value with respect to an increase in the temperature in the first temperature range.

2. The vehicle according to claim 1, wherein the torque threshold value is higher in a case where the temperature is low than in a case where the temperature is high.

3. A vehicle control method of controlling a vehicle including a steering device including a rack shaft connected to wheels, a steering shaft connecting a steering wheel and the rack shaft, and a turning actuator including an electric motor connected to the rack shaft or the steering shaft via a motion conversion mechanism, and a torque sensor configured to detect a steering torque by a driver, the torque sensor being attached to the steering shaft, the vehicle control method comprising:
   switching from turning of the wheels by an automatic steering control to turning of the wheels based on at least a steering operation by the driver in a case where a torque detected by the torque sensor exceeds a torque threshold value during execution of the automatic steering control of the wheels; and
   changing the torque threshold value in accordance with a temperature of the motion conversion mechanism,
   wherein a range of the temperature includes a first temperature range and a second temperature range on a low-temperature side with respect to the first temperature range;
   wherein the torque threshold value is higher in the second temperature range than in the first temperature range; and
   wherein a decrease rate of the torque threshold value with respect to an increase in the temperature in the second temperature range is larger than a decrease rate of the torque threshold value with respect to an increase in the temperature in the first temperature range.

* * * * *